(12) United States Patent
Kumar et al.

(10) Patent No.: US 7,962,368 B2
(45) Date of Patent: Jun. 14, 2011

(54) PURCHASE SEQUENCE BROWSER

(75) Inventors: Shailesh Kumar, San Diego, CA (US);
Megan Thorsen, Sunnyvale, CA (US);
Ashutosh Joshi, San Diego, CA (US);
Sergei Tolmanov, Walnut Creek, CA (US); Helen Geraldine E Rosario, Austin, TX (US); Colin E Little, Emeryville, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1272 days.

(21) Appl. No.: 11/551,683

(22) Filed: Oct. 20, 2006

(65) Prior Publication Data

US 2007/0282699 A1      Dec. 6, 2007

Related U.S. Application Data

(60) Provisional application No. 60/813,546, filed on Jun. 13, 2006, provisional application No. 60/803,814, filed on Jun. 2, 2006.

(51) Int. Cl.
*G06Q 30/00* (2006.01)
(52) U.S. Cl. ................... 705/26; 705/27; 705/37
(58) Field of Classification Search ............ 705/26, 705/37, 26.1, 27.1
See application file for complete search history.

(56) References Cited

U.S. PATENT DOCUMENTS

| | | | |
|---|---|---|---|
| 7,630,986 B1 * | 12/2009 | Herz et al. | 1/1 |
| 2004/0031058 A1 * | 2/2004 | Reisman | 725/112 |

OTHER PUBLICATIONS

Alan L Montgomery, Applying quantitative marketing techniques to the Internet, Interfaces. Linthicum: Mar./Apr. 2001. vol. 31, Iss. 2; p. 90, downloaded from ProQuest Direct on the Internet on Aug. 22, 2010, 18 pages.*

* cited by examiner

*Primary Examiner* — James Zurita
(74) *Attorney, Agent, or Firm* — Mintz, Levin, Cohn, Ferris, Glovsky and Popeo, P.C.

(57) ABSTRACT

The invention provides a purchase sequence browser (PuSB), i.e. a graphical user interface (GUI) that facilitates insight discovery and exploration of product affinities across time, generated by a purchase sequence analysis of a retailer's transaction data. A purchase sequence browser allows the user to browse the most significant product phrases discovered by an exhaustive search of the product affinities across time; explore the retail grammar to create both forward and backward phrase trees or alternate purchase paths starting from, or ending in, a product; generate consistent purchase sequences given some constraints on the products and their order; and profile the value of a product across time with regard to other products fixed in time.

18 Claims, 15 Drawing Sheets

FROM basket centric counting:

Group all TO products in same time-lag hence in one basket

TO basket centric counting:

Group all FROM products in same time-lag ago in one basket

EACH basket centric counting:

Each visit-pair is a purchase sequence context instance

PURCHASE SEQUENCE BROWSER

CROSS REFERENCE TO RELATED APPLICATIONS

This application claims priority to provisional U.S. patent applications Ser. Nos. 60/813,546, dated Jun. 13, 2006 and 60/803,814, dated Jun. 2, 2006, each of which is incorporated herein in its entirety by this reference thereto.

BACKGROUND OF THE INVENTION

1. Technical Field

The invention relates to the visual exploration of consistent patterns in customer purchase behavior across time. More particularly, the invention relates to a purchase sequence browser.

2. Description of the Prior Art

A Model of the Retail Behavior of Customers

Customer purchase behavior may be characterized as a mixture of projections of time-elapsed latent purchase intentions. A customer purchases a particular product at a certain time in a certain store with a certain intention, e.g. weekly grocery, back-to-school, etc. An intention is latent, i.e. it is not obvious or announced, although it may be deduced from the context of the products purchased. Each visit by a customer to the store may reflect one or more (mixture of intentions. Each intention may involve purchase of one or more products. For a multi-product intention, it is possible that the customer may not purchase all the products associated with that intention either at the same store or in the same visit. The transaction data only reflects a subset or a projection of a latent intention for several reasons, for example, maybe the customer already has some of the other products associated with the intention, or he received them as a gift, or he purchased them at a different store, etc. Finally, an intention may be spread across time. For example, certain intentions, such as kitchen remodeling or setting up a home office, may take several weeks and multiple visits to different stores.

A Model of Retail Transaction Data

Retail transaction data may be characterized as a time-stamped sequence of market baskets. The key characteristics of such a transaction data are:

Noisy—both intentional and impulsive purchases;
Incomplete—only projections of intentions present;
Overlapping—mixture of intentions in the same visit;
Indirect—purchase drivers or customer intentions are latent;
Unstructured—customers have different length time histories; and
Time-component—patterns in the data elapse along time.

These characteristics pose challenges in discovering consistent and significant patterns of purchase behavior from transaction data that may be used for making precise, timely, and profitable decisions by retailers.

SUMMARY OF THE INVENTION

The invention provides a purchase sequence browser (PuSB), i.e. a graphical user interface (GUI) that facilitates insight discovery and exploration of product affinities across time, generated by a purchase sequence analysis of a retailer's transaction data. A purchase sequence browser uses product affinities across time to create a retail grammar, based on these time-based product affinities. This allows the user to browse the most significant product phrases, i.e. consistent purchase sequences discovered by an exhaustive search of the product affinities across time; explore the retail grammar to create both forward and backward phrase trees or alternate purchase paths starting from, or ending in, a product; generate consistent purchase sequences given some constraints on the products and their order; and profile the value of a product across time with regard to other products fixed in time.

DETAILED DESCRIPTION OF THE INVENTION

The invention provides a purchase sequence browser (PuSB), i.e. a graphical user interface (GUI) that facilitates insight discovery and exploration of product affinities across time, generated by a purchase sequence analysis of a retailer's transaction data. A purchase sequence browser allows the user to browse the most significant product phrases discovered by an exhaustive search of the product affinities across time; explore the retail grammar to create both forward and backward phrase trees or alternate purchase paths starting from, or ending in, a product; generate consistent purchase sequences given some constraints on the products and their order; and profile the value of a product across time with regard to other products fixed in time.

Types of Product Affinity Analyses

Market basket analysis considers products that go-together in the same visit, can use consecutive visits to create a larger market basket, but ignores product affinities across time.

Purchase sequence analysis considers product affinities across time, for example before, after, by how much, etc., and uncovers more complex, novel, and actionable patterns.

Applications of Purchase Sequence Analysis

Purchase sequence analysis can uncover the retail grammar/language, i.e. the underlying structure of customer purchase behavior patterns over time, for a given customer base; find interesting product phrases, i.e. consistent and significant purchase sequences of two or more products; explore potential purchase paths that a customer might take in the future, i.e. the products that he might purchase based on current purchases; quantify the product coat-tail effect, i.e. the influence of a product purchased today on the purchase of other products in the future; understand the temporal-causality among products; and make timely and precise product recommendations to the right customer at the right time.

Advantages of Purchase Sequence Analysis

Purchase sequence analysis provides better understanding of the customers' current and future needs and wants; more leverage in influencing customer behavior to a higher lifetime value path through strategic promotions of the right products at the right time; an increase in the future revenue and margins by making the right market level promotions of products with high coat-tails today; increased accuracy in predicting the right time to market particular products to specific customers for maximum conversion; and improved product demand forecast based not only on seasonal patterns but also based on how purchases of past products affects purchases of future other products.

Purchase Sequence Analysis

Figure 1:
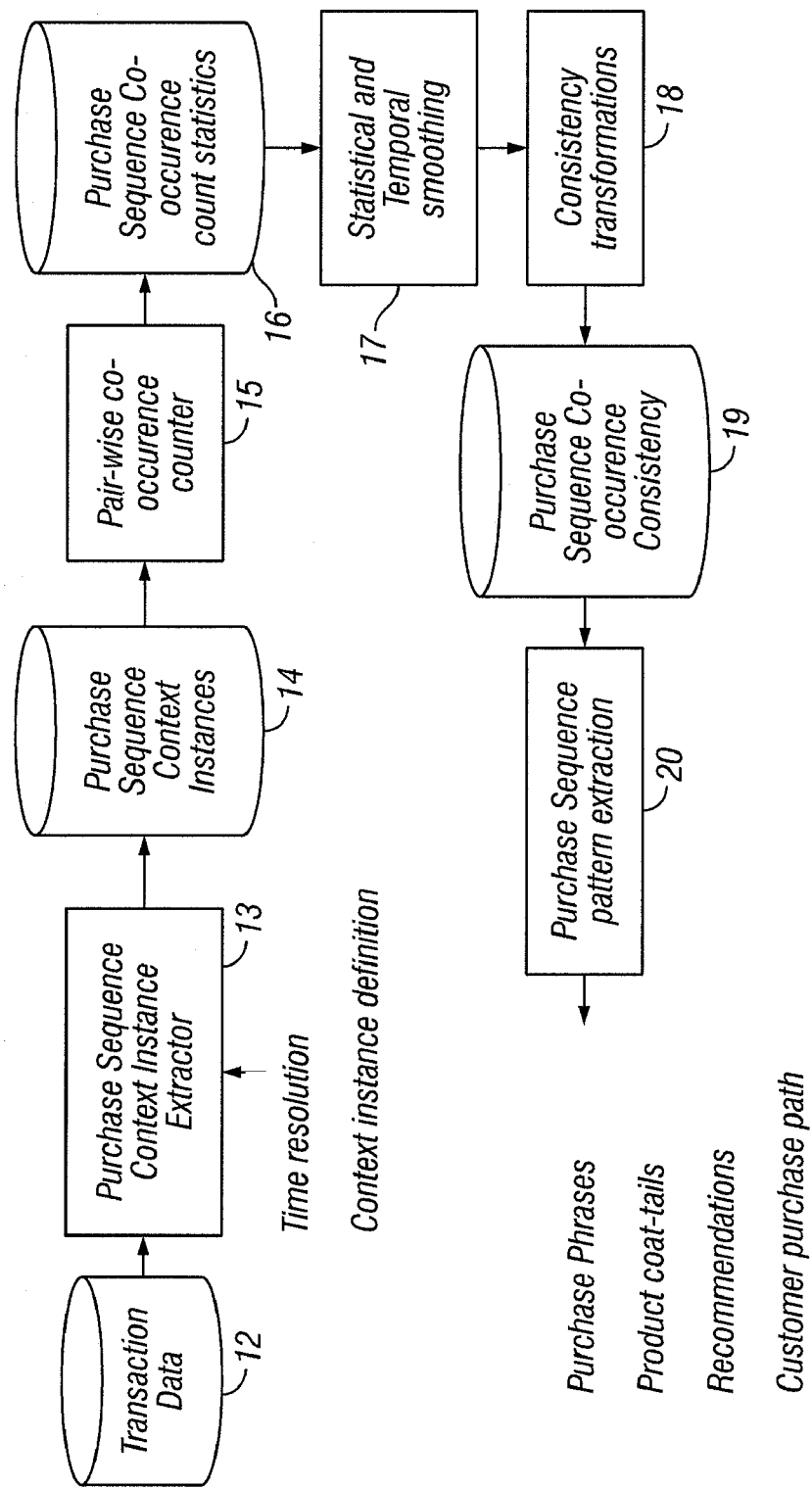
FIG. 1 is a block schematic diagram showing purchase sequence analysis.

FIG. 1 is a block schematic diagram showing purchase sequence analysis. In FIG. 1, transaction data 12 are provided to a purchase sequence context instance extractor 13 in view of current time resolution and a context instance definitions. An output is provided in the form of purchase sequence context instances 14, which are provided to a pair-wise co-occurrence counter 15. Resulting purchase sequence co-occurrence count statistics 16 are input to a statistical and temporal smoothing algorithm 17 and thence processed through consistency transformations 18. A resulting purchase sequence co-occurrence consistency value 19 is input to a purchase sequence pattern extraction module 20, which outputs such information as purchase phrases, product coat-tails, recommendations, and a customer purchase path.

Pair-Wise Purchase Sequence Context

Figure 2:
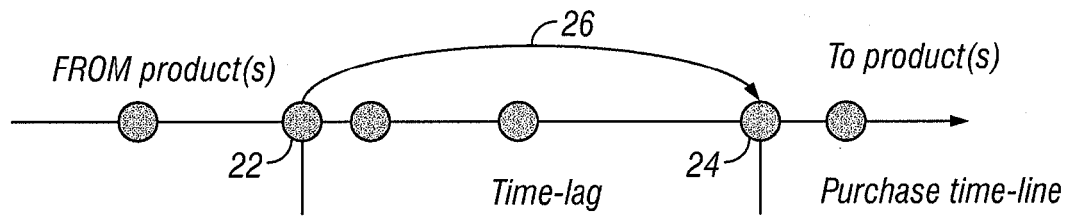
FIG. 2 is a is a time line diagram showing pair-wise purchase sequence context.

FIG. 2 is a time line diagram showing pair-wise purchase sequence context. There are three components to a purchase sequence context:

FROM product(s) set 22, which comprise products that were purchased in the past;

TO product(s) set 24, which comprise products that are purchased in the future; and Time-lag 26 between the "FROM-products" and the "TO-products."

Purchase Sequence Context Instances

Purchase sequence context instances 14 (FIG. 1) include:

Triplets of the form: (from-product set, time-lag, and a to-product set), which are:

Extracted from a pass through the transaction data.

By taking all combinations of the products in the FROM set and the TO set for any given time-lag.

Creating Purchase Sequence Context Instances

There are three methods of creating purchase sequence context instances as shown in FIG. 3, a timeline diagram showing the purchase history of a customer. These methods differ in the way the FROM set and the TO set are defined for a given time-lag as we scan the customer history.

Figure 3A:
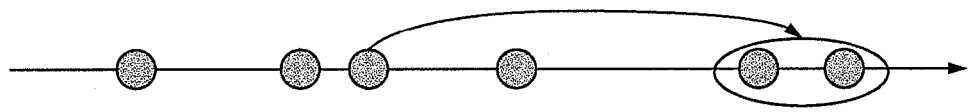
FIG. 3 is a timeline diagram showing purchase sequence context instance types.

(1) FROM basket centric counting: For each visit of a customer, except the last visit, treated as a FROM basket, the union of all the future visits that are at the same time-lag from the FROM visit is treated as the TO basket as shown in FIG. 3a.

Figure 3B:
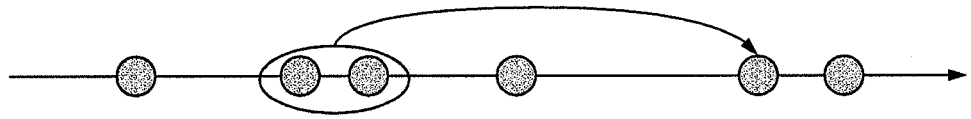

(2) TO basket centric counting. For each visit of a customer, except the first visit, treated as a TO basket, the union of all the past visits that are at the same time-lag from the TO visit is treated as the FROM basket as shown in FIG. 3b.

Figure 3C:
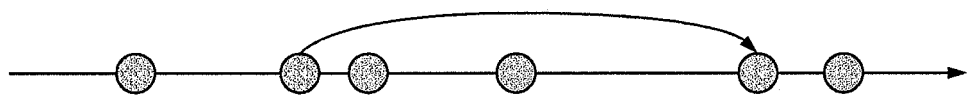

(3) FROM-TO basket centric counting. For each visit-pair in a customer's history, the first visit basket is treated as the FROM basket, the second visit in the pair is treated as the TO basket as shown in FIG. 3c.

Pair-Wise Co-Occurrence Counter

Figure 4:
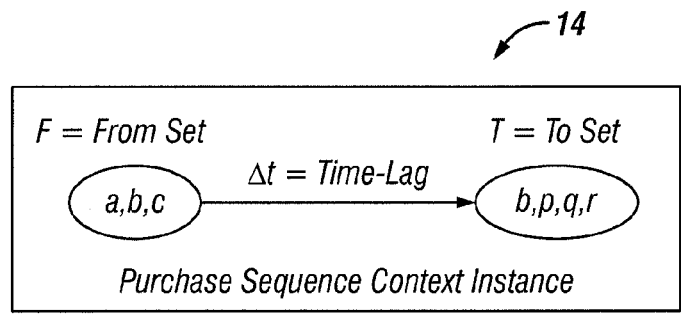
FIG. 4 is a time line diagram showing a purchase sequence context instance.

FIG. 4 shows a purchase sequence context instance 14. It is comprised of the FROM set {a, b, c} with three products and a TO set {b, p, q, r} with 4 products with a certain time lag between them. For every purchase sequence context instance, such as shown in FIG. 4, co-occurrence counts for the following triplets are updated by 1:

$$\begin{Bmatrix} \langle a, \Delta t, b \rangle, & \langle a, \Delta t, p \rangle, & \langle a, \Delta t, q \rangle, & \langle a, \Delta t, r \rangle, \\ \langle b, \Delta t, b \rangle, & \langle b, \Delta t, p \rangle, & \langle b, \Delta t, q \rangle, & \langle b, \Delta t, r \rangle, \\ \langle c, \Delta t, b \rangle, & \langle c, \Delta t, p \rangle, & \langle c, \Delta t, q \rangle, & \langle c, \Delta t, r \rangle, \end{Bmatrix}$$

Margins and Totals Counter

For the margins and totals counter 15 (FIG. 1) there are two ways of updating the margin and the total counts:

(1) The un-weighted margins and total counter, increments each margin and total by 1.

FROM MARGINS: $\langle a,\Delta t,*\rangle, \langle b,\Delta t,*\rangle, \langle c,\Delta t,*\rangle +=1$ TO MARGINS: $\langle *,\Delta t,b\rangle, \langle *,\Delta t,p\rangle, \langle *,\Delta t,q\rangle, \langle *,\Delta t,r\rangle +=1$ TOTAL: $\langle *,\Delta t,*\rangle +=1$ (2) The weighted margins and total, weigh the margin and total by the sizes of the from set (F) and to set (T).

FROM MARGINS: $\langle a,\Delta t,*\rangle, \langle b,\Delta t,*\rangle, \langle c,\Delta t,*\rangle +=|T|$ TO MARGINS: $\langle *,\Delta t,b\rangle, \langle *,\Delta t,p\rangle, \langle *,\Delta t,q\rangle, \langle *,\Delta t,r\rangle +=|F|$ TOTALS: $\langle *,\Delta t,*\rangle +=|T|\times|F|$ Temporal and Statistical Smoothing The purchase sequence co-occurrence counts is a three dimensional matrix where the first two dimensions are products and the third dimension is time-lag. When the number of products is large or the time-resolution is fine it is possible that this three dimensional matrix becomes very sparse. To overcome this spartisy problem, we apply two types of smoothings: The temporal smoothing and the statistical smoothing 17 (FIG. 1). Both these smoothings are applied not just to the co-occurrence counts but also to the margins and the totals counts, thus the following four sequences are affected by these smoothings:

Co-occurrence sequences:

$$\{(\langle a,\Delta t=1,b\rangle, \langle a,\Delta t=2,b\rangle, \dots, \langle a,\Delta t=\Delta T_{max}, b\rangle)\} 550\ a, b$$

From sequences:

$$\{(\langle a,\Delta t=1,*\rangle, \langle a,\Delta t=2,*\rangle, \dots, \langle a,\Delta t=\Delta T_{max},*\rangle)\} \forall a$$

To sequences:

$$\{(\langle *,\Delta=t\ 1,b\rangle, \langle *,\Delta t=2,b\rangle, \dots, \langle *,\Delta t=\Delta T_{max},b\rangle)\} \forall b$$

Total sequence:

$$\{(\langle *,\Delta t=1,*\rangle, \langle *,\Delta t=2*\rangle, \dots, \langle *,\Delta t=\Delta T_{max},*\rangle)\}$$

Temporal smoothing is applied to each sequence using a low pass kernel filter (with any shape such as Gaussian, triangular, or rectangular), to smooth count estimates based on neighboring counts, and to remove temporal noise in these sequences.

Statistical smoothing is applied to each sequence to resolve any sparsity issues that are still remaining.

Purchase Sequence Co-Occurrence Consistency

Figure 5:
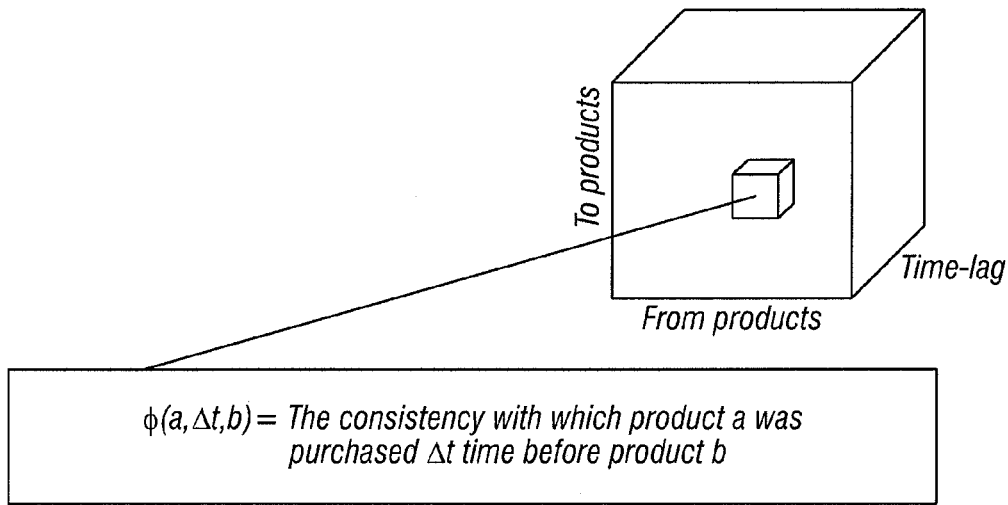
FIG. 5 is a three dimensional matrix showing purchase sequence co-occurrence consistency according to the present invention.

FIG. 5 is a three dimensional matrix showing purchase sequence co-occurrence consistency 19 according to the present invention. In FIG. 5, a three dimensional-matrix is shown with a FROM product dimension, a TO product dimension, and a time-lag dimension. Each element is interpreted as:

$\phi(a, \Delta t, b)$ = The consistency with which product a was purchased $\Delta t$ time before product b Note: $\begin{cases} \phi(a, \Delta t, b) = \phi(b, -\Delta t, a) \\ \phi(a, 0, b) = \phi(b, 0, a) \end{cases}$ A Product Phrase A product phrase is any time-stamped sequence of products:

$$X = (\langle t_1, x_1 \rangle, \langle t_2, x_2 \rangle, \ldots, \langle t_n, x_n \rangle): \begin{cases} t_i \leq t_{i+1} \\ t_i = t_j \Rightarrow x_i \neq x_j \end{cases}$$

Figure 6:
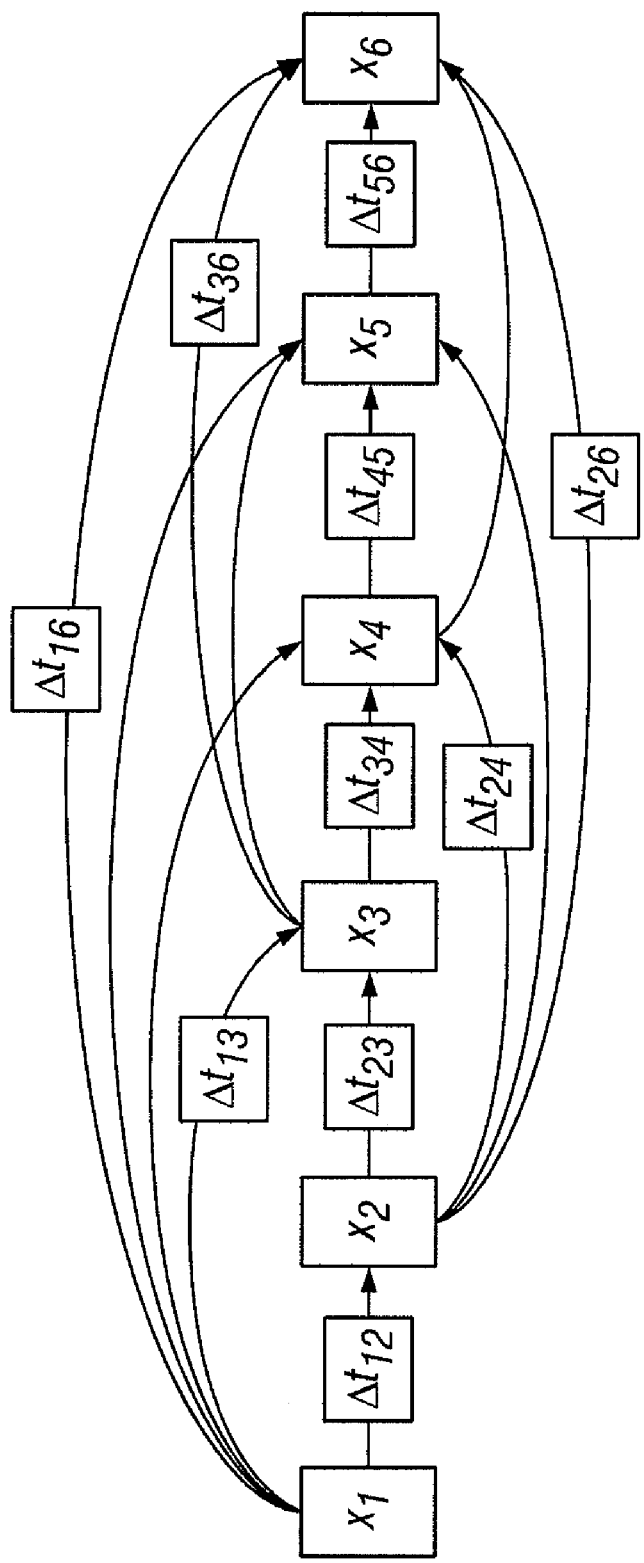
FIG. 6 is a block schematic diagram showing phraseness of a product phrase.

FIG. 6 is a block schematic diagram showing a phrase with six products.

The following lists some properties of a phrase:

A phrase must have at least two products (n>1);
All products at any given time are unique;
All times are relative. So without loss of generality:

$t_1 = 0$

Products may repeat at different times; and
A product bundle is a special case of a product phrase. When all products in the phrase are unique and purchased together i.e. all time lags are zero, then it becomes a product bundle.

$t_n = 0$

Phraseness of a Product Phrase

The phraseness of a phrase quantifies the cohesive-consistency of the phrase and is measured as some aggregation of the pair-wise consistency between all pairs of products in it.

$\pi(x|\Phi) = f([\phi(x_i, \Delta^t{}_{ij} = t_j - t_i, x_j)])$

Example Measures Phraseness

Two classes of aggregate measures quantifying the phraseness of a phrase are defined here:

(1) Simple aggregate measure: This measure just aggregates the consistency measures of the rows (from products) and columns (to products) into a single number.

$$\pi(x|\Phi) = \underset{i=1\ldots n}{fagg} \left\{ \underset{j=1\ldots n}{tagg} \{\phi(x_i, \Delta t_{ij} = t_j - t_i, x_j)\} \right\}$$

fagg=aggregate across from products: (min/max/avg/Gibbs)
tagg=aggregate across to products: (min/max/avg/Gibbs)

Different phraseness measures may be defined by various combinations of the choices of the fagg and tagg functions.

(2) Eigen aggregate measure: This measure first takes the first Eigen vector (un-normalized) of the phrase matrix and aggregates the various components of this vector into a single measure of phraseness.

$$\pi(x|\Phi) = \underset{i=1\ldots n}{eagg} \{eig[\phi(x_i, \Delta t_{ij} = t_j - t_i, x_j)]\}$$

eig=first Eigen VECTOR of the matrix
eagg=aggregate of the values (min/max/avg/Gibbs)

Purchase Sequence Browser

Purchase Sequence Browser GUI

Figure 7:
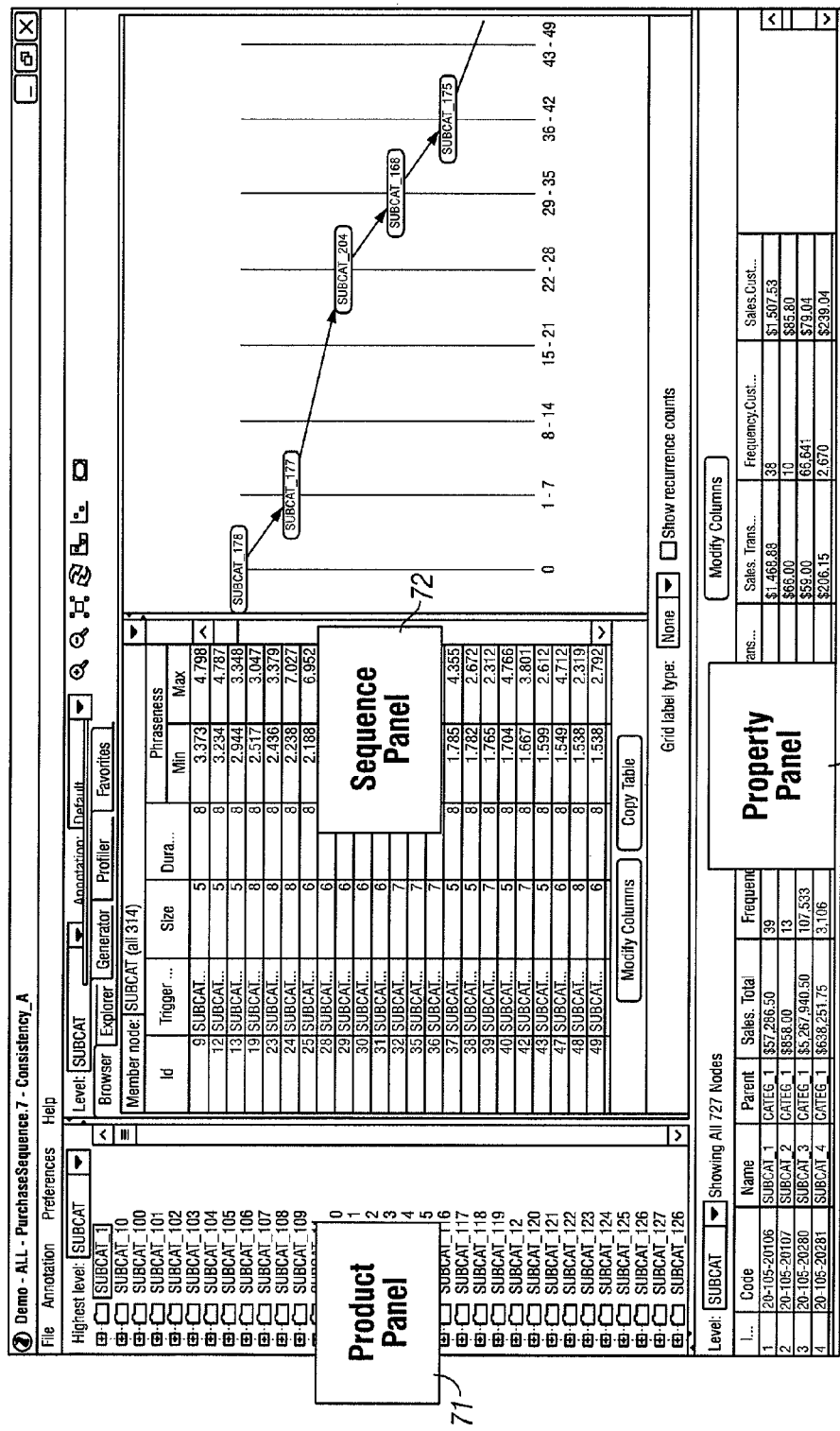
FIG. 7 is a screen shot showing a purchase sequence browser according to the invention.

FIG. 7 is a screen shot showing a purchase sequence browser 70 according to the invention. As shown in FIG. 7, the presently preferred purchase sequence browser comprises a product panel 71, a sequence panel 72, and a property panel 73.

Panels in the Purchase Sequence Browser

Figure 8:
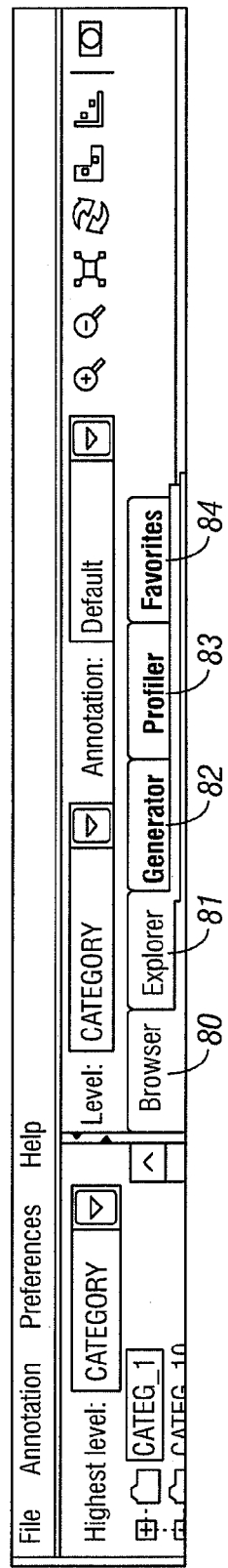
FIG. 8 is a screen shot showing panels in a purchase sequence browser according to the invention.

FIG. 8 is a screen shot showing panels in a purchase sequence browser according to the invention. FIG. 8 shows the following features:

Browser 80—allows the user to browse pre-created high consistency product phrases;
Explorer 81—the user can use this feature to grow/shrink purchase sequences manually;
Generator 82—this feature automatically generates phrases from a product set and any ordering constraints;
Profiler 83—this feature shows the time profiles of products for a given sequence; and
Favorites 84—this feature collects sequences that a user adds to favorites.

BROWSER Panel

Figure 9:
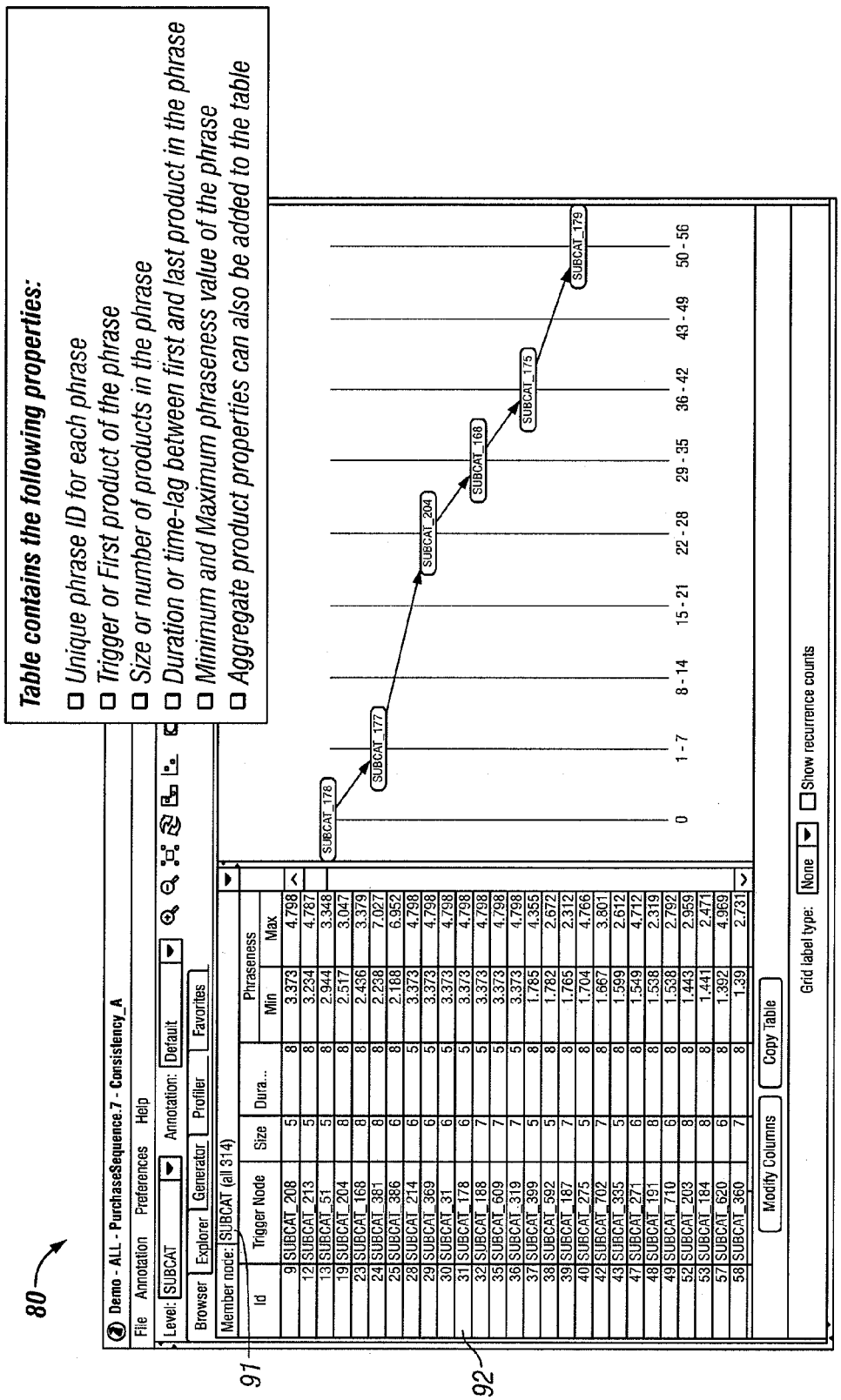
FIG. 9 is a screen shot showing a browser panel in a purchase sequence browser according to the invention.

FIG. 9 is a screen shot showing a browser panel 80 in a purchase sequence browser according to the invention. In the PSB, a set of product bundles is pre-created. Similarly, the BROWSER panel in the purchase sequence browser shows pre-created product phrases. The user selects a product from a drop down list 91. All pre-created phrases that contain this product are listed in a table 92.

The table contains the following properties:

Phrase ID=a unique ID assigned to each phrase;
Trigger Product (first product) name;
Length or Size of the phrase;
Duration of the phrase i.e. the time-lag between the first and last product
Phraseness measure (min/max); and
Modify/Copy table tabs as in bundles/bridges.

FIG. 9 is a screen shot showing a browser panel in which a purchase product phrase is viewed according to the invention.

EXPLORER Panel

With regard to use of the EXPLORER panel 81, select a single product first:

From the properties panel, product panel, or graph panel RIGHT CLICK ☐ Drop-down menu. The drop-down menu provides options for:

Display Phrases;
Explore Phrase FORWARD; and
Explore Phrase BACKWARD.

As a result, this product is placed either in the top LEFT or top RIGHT corner of the EXPLORER panel depending on whether the user selected (FORWARD) or (BACKWARD) respectively.

EXPLORER Panel PHRASE TREE

Figure 10A:
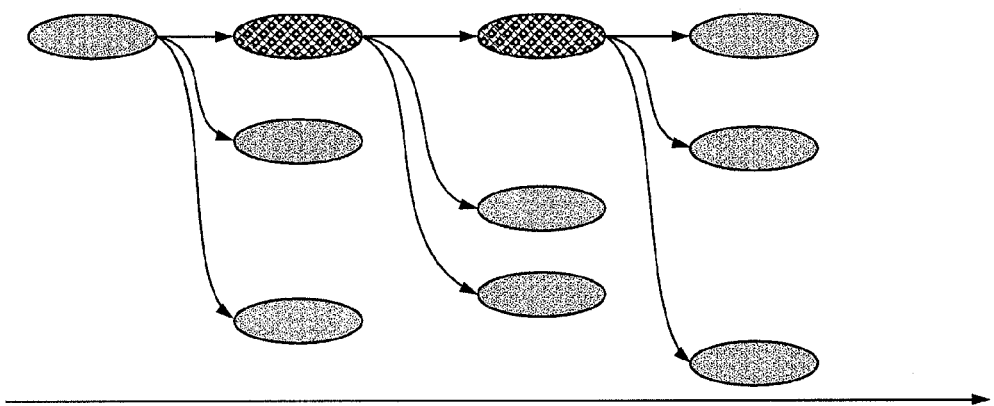
FIG. 10 is a tree diagram showing a forward phase tree (FIG. 10) and a backward phase tree (FIG. 10)
Figure 10B:
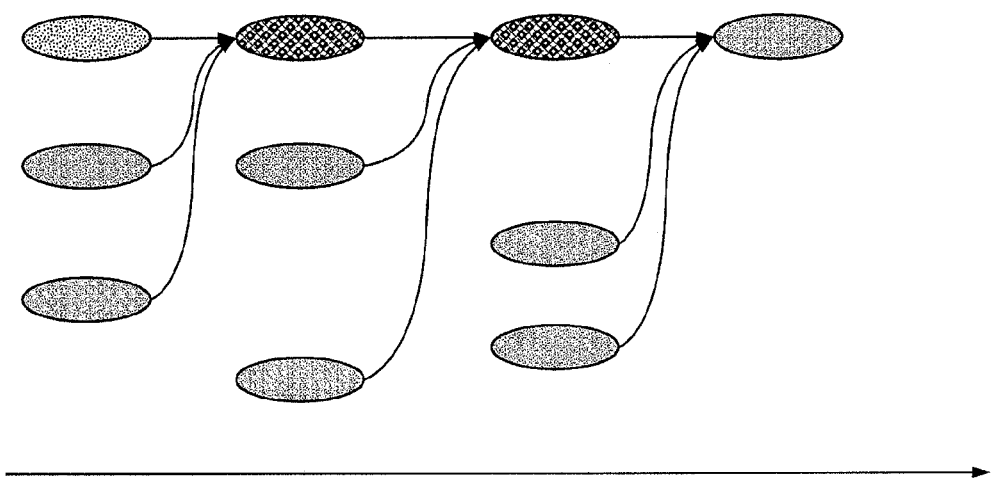

FIG. 10 is a tree diagram showing a forward phase tree (FIG. 10) and a backward phase tree (FIG. 10). With regard to FIG. 10:

Parameters:

Time Scale: (#Days=1 unit)—typical time scales are weekly (7 days=1 unit), monthly (30 days=1 unit), or quarterly (120 days=1 unit). The retailer may decide this parameter based on their customer's average time between consecutive visits.

Maximum Length—the maximum number of products in a typical phrase.

In this example, the maximum length is 8.

Maximum Branch—the number of options or branches at every stage or phrase expansion. Only the top options based on the parent phrase (i.e. phrase from the root node to the current node) are shown. In this example the maximum branching factor is three.

Layout: Phrase Tree

The trigger product is displayed. The user can decide to grow the phrase to any time-lag including zero time-lag. The top three products at the chosen time-lag are displayed. The user can further expand these three choices to a future time-lag and so on.

ACTIVE Product

Figure 11:
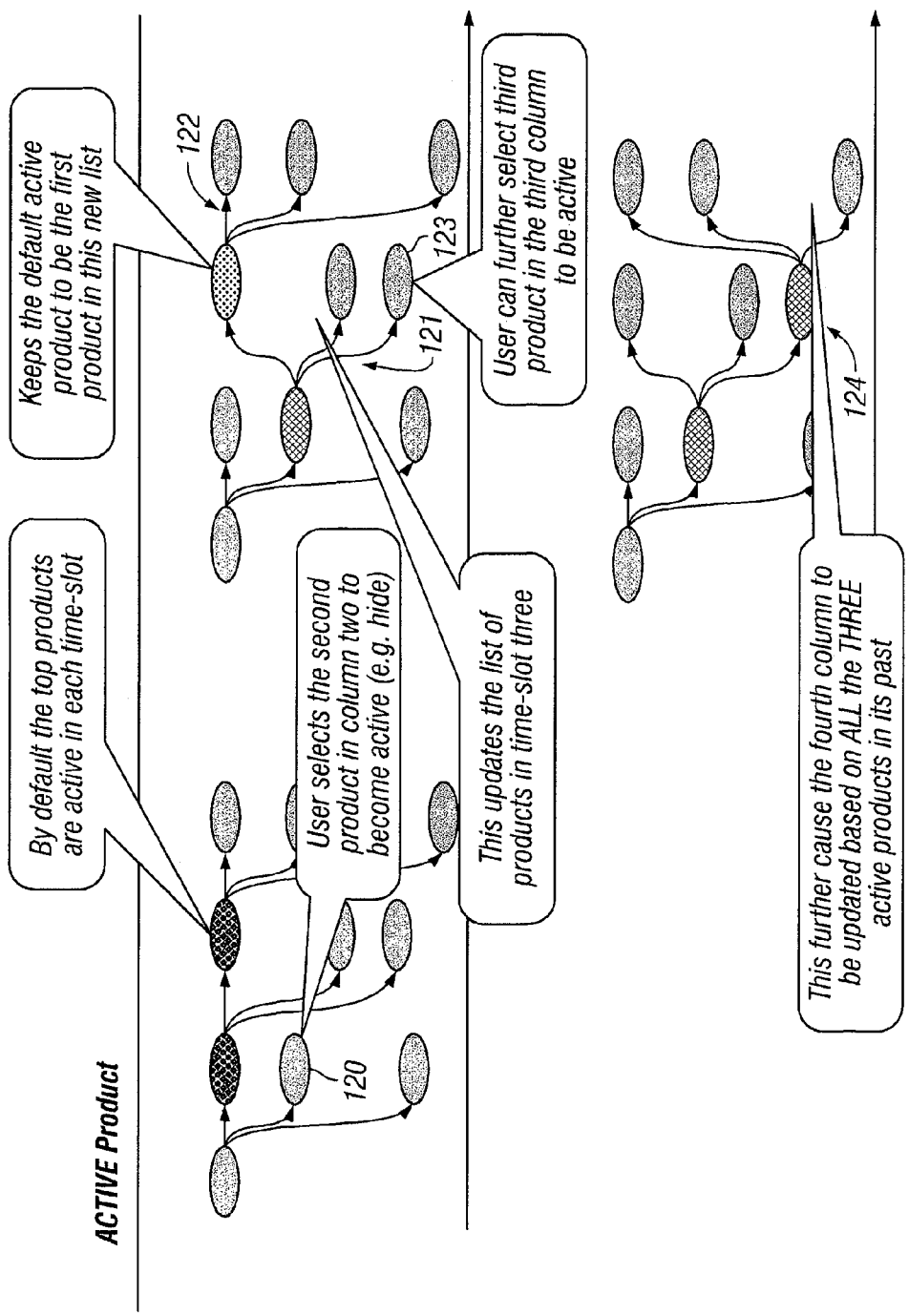
FIG. 11 is a tree diagram showing an active product according to the invention.

At every step during phrase exploration, the user selects one product from the three available choices as the active product, by clicking on that product. This automatically shows the top three choices for extending the phrase selected so far to the next time step. The user can select any product displayed on the screen (including products at previous time stamps) as active products. The top three products are then computed from the active product taking into account all the products and their time stamps that have already been selected so far (see FIG. 11).

ACTIVE Products and BACKWARD Exploration

Figure 12:
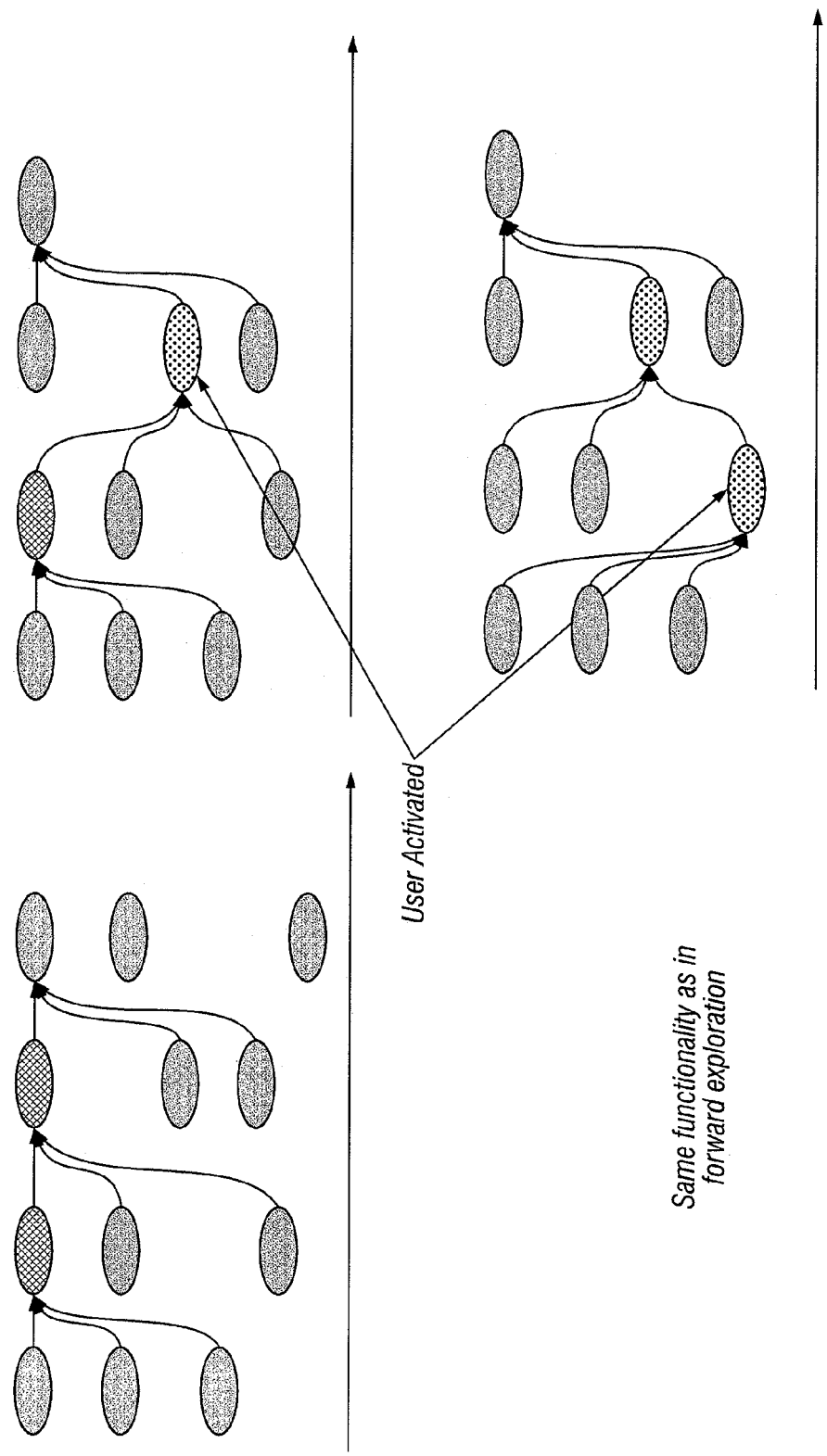
FIG. 12 is a tree diagram showing backward exploration for an active product according to the invention.

FIG. 12 is a tree diagram showing backward exploration for an active product according to the invention. The approach uses the same functionality as in forward exploration.

Keeping a Time Lag or Not?

Figure 13:
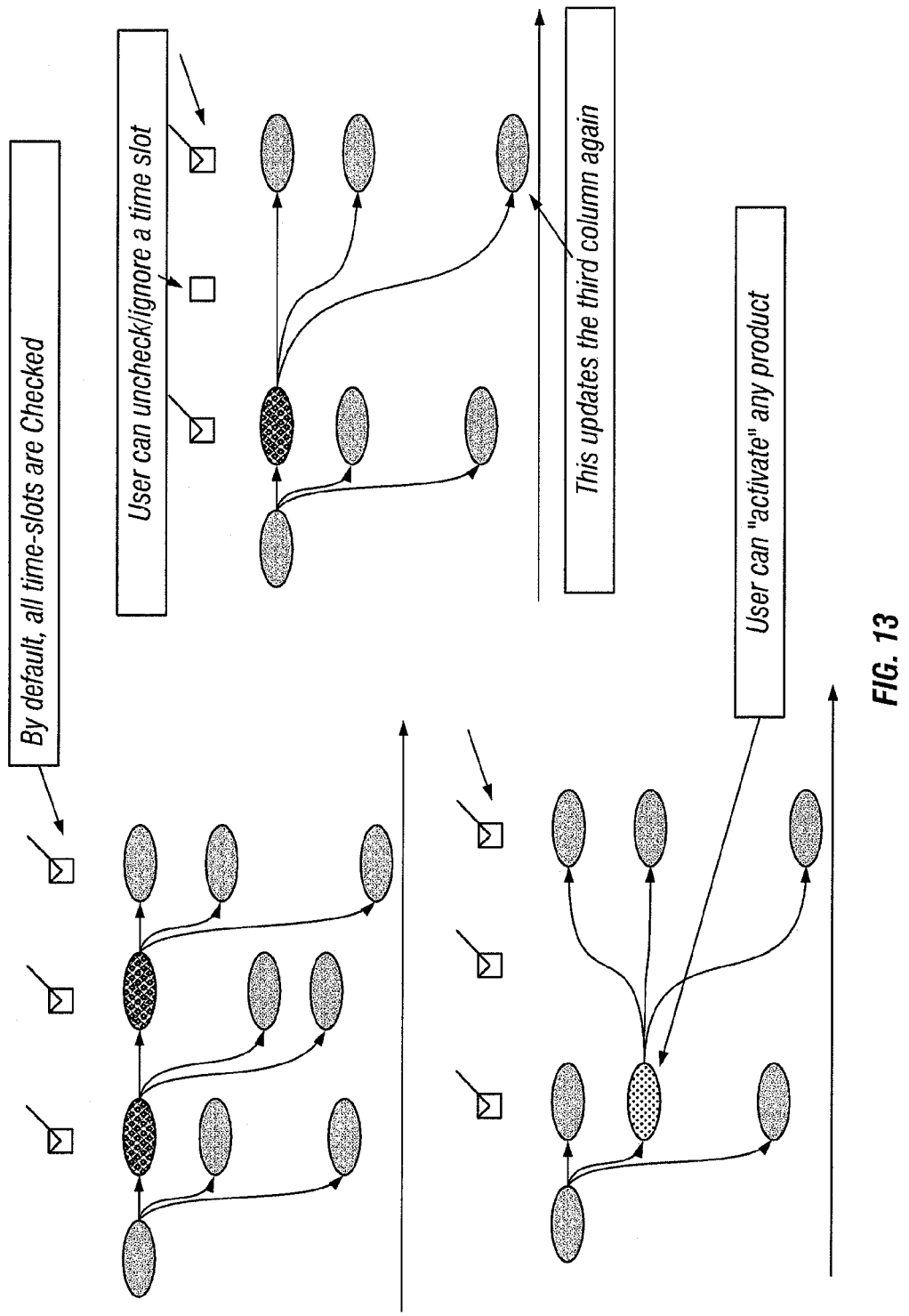
FIG. 13 is a tree diagram showing keeping of a time lag or not for an active product according to the invention.

The user can skip over time steps by right-clicking on the active product and selecting the desired time step from the "Grow to time" menu (FIG. 13).

Explorer Panel Summary

Parameters for the explorer panel 81 (FIG. 8) are specified in the browser file, for example, as follows:

Max Phrase Length

Max Branching Factor

The parameters controlled by user in the browser comprise, for example:

Scale: #days

Select any time-lag to explore the phrase further.

At any time, the user can also select a product to be the root node and start the tree.

Using the Consistencies to GROW FORWARD

Figure 14:
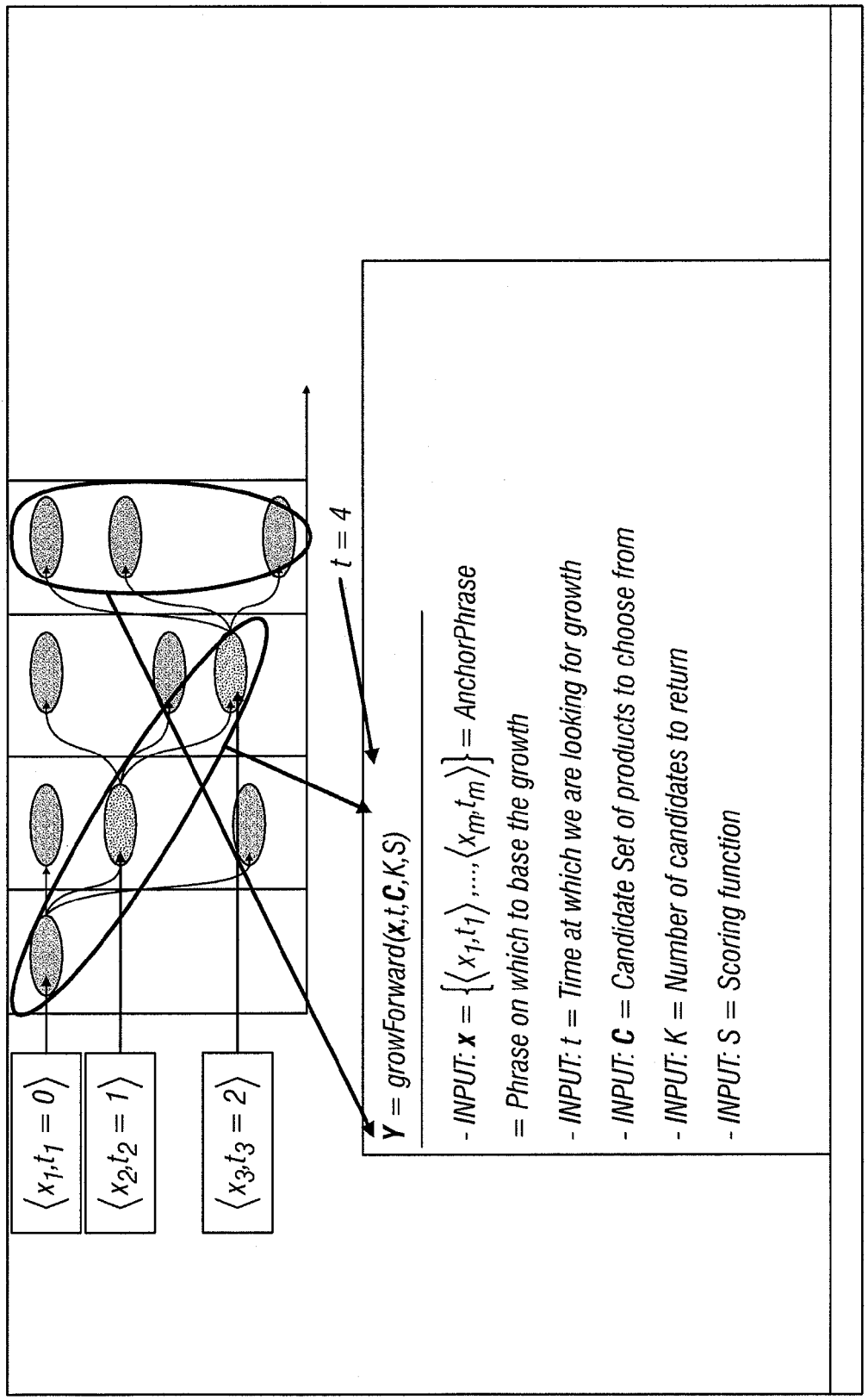
FIG. 14 is a tree diagram showing the use of consistencies to grow forward according to the invention.

FIG. 14 is a tree diagram showing the use of consistencies to grow forward according to the invention.

FORWARD Aggregate Scoring functions:

$Y = growForward(x, t, C, K, S)$

- For every $y_i \in C ==>$ Compute: $s_i = S(y|x, t)$

- Sort the $y$'s in descending order of score

Figure 15:
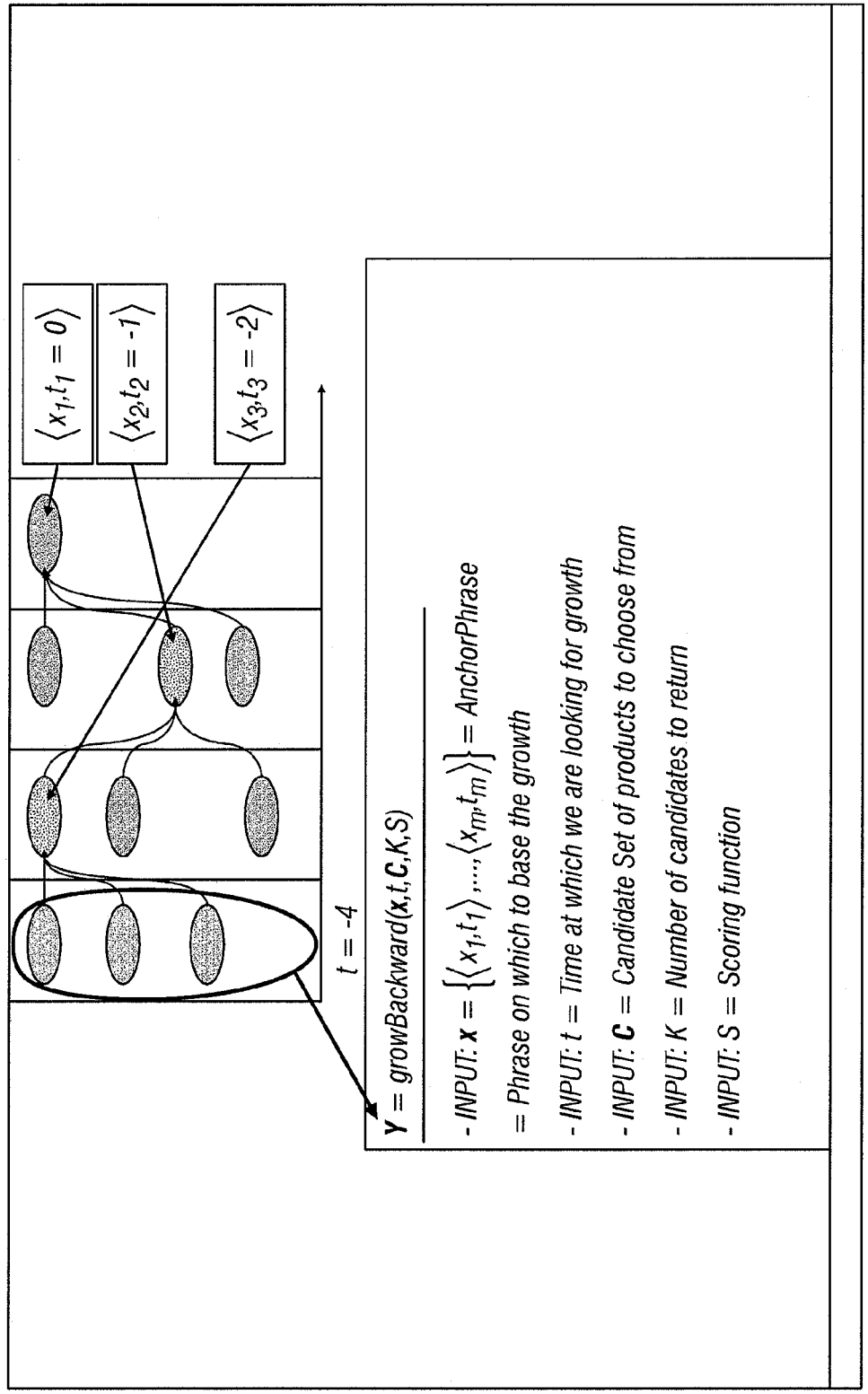
FIG. 15 is a tree diagram showing the use of consistencies to grow backward according to the invention.

- Return the TOP $K$ pairs: $Y = \{\langle y_{(1)}, s_{(1)} \rangle, \ldots, \langle y_{(K)}, s_{(K)} \rangle\}$ Here x is the phrase so far, t is the time-stamp at which the next set of products are sought, C is the set of candidate products to choose from, K is the number of top products sought, and S is the scoring function. These scoring functions are all based on the purchase sequence context consistency between the products in the current phrase and the candidate time-product combination. User can pick one of several scoring functions for example:

$ANY(max): S(y|x, t) = \max_{i=1\ldots m} \{\phi(x_i, y, \Delta t = t - t_i)\}$ $EVERY(min): S(y|x, t) = \min_{i=1\ldots m} \{\phi(x_i, y, \Delta t = t - t_i)\}$ $ALL(avg): S(y|x, t) = \frac{1}{m}\sum_{i=1}^{m} \phi(x_i, y, \Delta t = t - t_i)$ $PHRASE(eig): S(y|x, t) = \pi(x \oplus \langle y, t \rangle)$ Using the Consistencies to GROW BACKWARD FIG. 15 is a tree diagram showing the use of consistencies to grow backward according to the invention.

BACKWARD Aggregate Scoring function is substantially the same as before:

$Y = growBackward(x, t, C, K, S)$

- For every $y_i \in C ==>$ Compute: $s_i = S(y|x, t)$

- Sort the $y$'s in descending order of score

- Return the TOP $K$ pairs: $Y = \{\langle y_{(1)}, s_{(1)} \rangle, \ldots, \langle y_{(K)}, s_{(K)} \rangle\}$ $ANY(max): S(y|x, t) = \max_{i=1\ldots m} \{\phi(y, x_i, \Delta t = t_i - t)\}$ $EVERY(min): S(y|x, t) = \min_{i=1\ldots m} \{\phi(y, x_i, \Delta t = t_i - t)\}$ $ALL(avg): S(y|x, t) = \frac{1}{m}\sum_{i=1}^{m} \phi(y, x_i, \Delta t = t_i - t)$ $PHRASE(eig): S(y|x, t) = \pi(x \oplus \langle y, t \rangle)$ GENERATOR Panel Functionality The generator panel 82 (FIG. 8), automatically generates one or more phrases that satisfies a set of product constraints and a set of order constraints as noted below:

Product Constraint [Required Parameter]

User may select two or more products from the product panel;

These may be selected by simply dragging and dropping two or more products from the product panel or property panel. These may also be selected from a bundle, bridge, neighborhood, or sub-graph of the graph.

Generator has to generate product phrases using only these products.

Order Constraint [Optional Parameter]

User may specify order of certain products by moving them up/down;

Each product may be anchored or non-anchored in a particular position;

An anchored product cannot change its position, i.e. all products above/below it must remain there in their ordering;

Thus, we may have a complete or partial or no product order constraint.

For example, with regard to a neighbor or bundle structure, the user may specify the first or the last product as part of the order constraint.

For example, with regard to a bridge structure, the user may specify that all products in the first group of a bridge structure must come before the bridge product and all products of the second group must come after the bridge product as part of the order constraint.

Result: A list of product phrases that satisfy both the product and order constraints.

GENERATOR Panel

Figure 16:
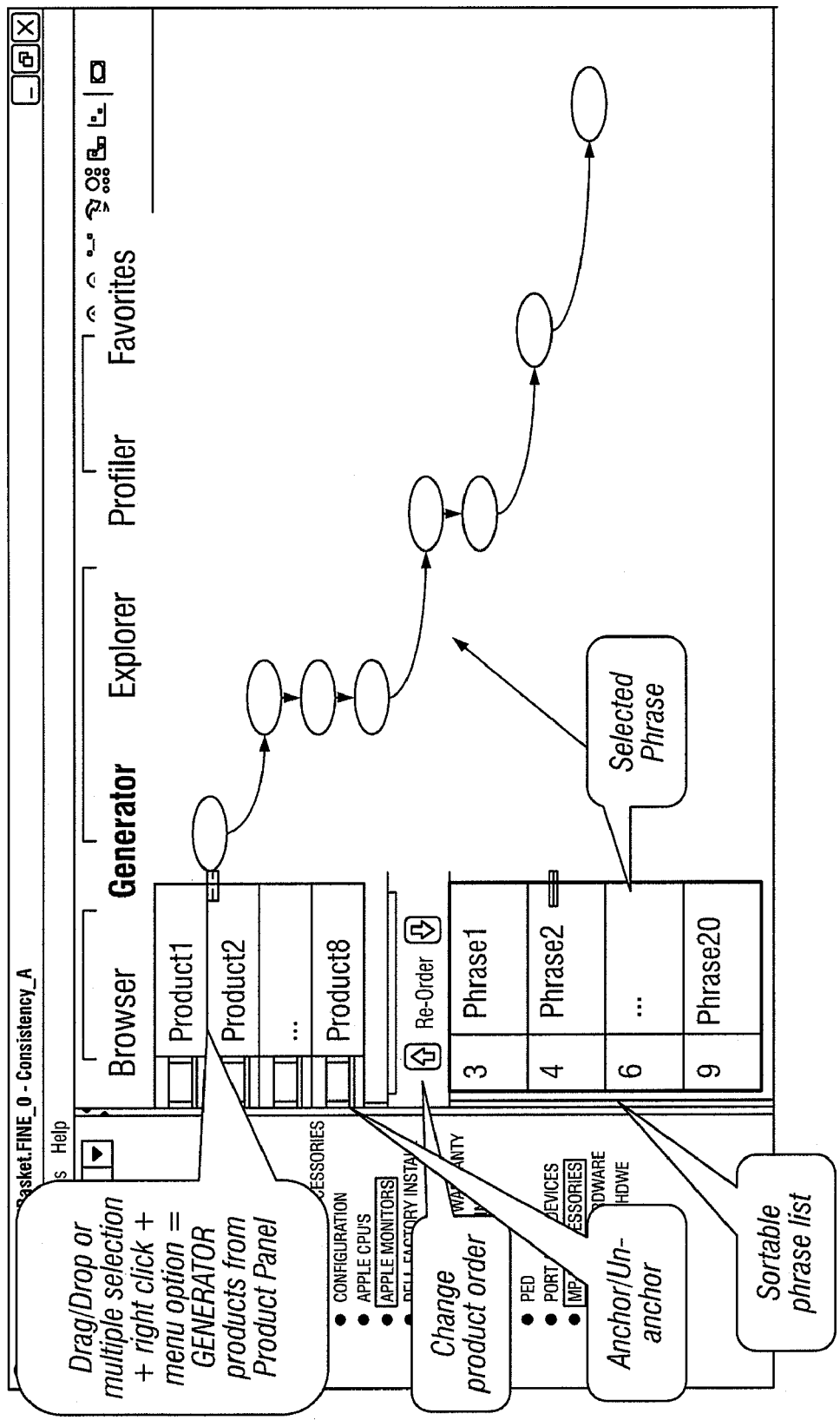
FIG. 16 is a screen shot showing a generator panel according to the invention.

FIG. 16 is a screen shot showing a generator panel according to the invention. In FIG. 16, a user can drag/drop or make multiple selections, for example by right clicking for a list of menu options the include generator products from the product panel. The user may also request the creation of a phrase from a product bundle, a product neighborhood of certain size, or a bridge structure. The user may also change the product order, anchor or un-anchor products, view a sortable phrase list, and view selected phrases.

PROFILER Panel

The profiler panel 83 (FIG. 8) may be selected by the user.
What is Profiled?
Consistency or Phraseness of one or more products
Against what is the profile generated?
A given phrase with entire phrase blanket, i.e. all products in the phrase are affecting the profile.
A given phrase with a subset phrase blanket, i.e. a chosen few products in the phrase affect the profile.
A given phrase with maximal phrase blanket, i.e. each profile value is maximized across available phrase blankets.

PROFILER Panel

Figure 17:
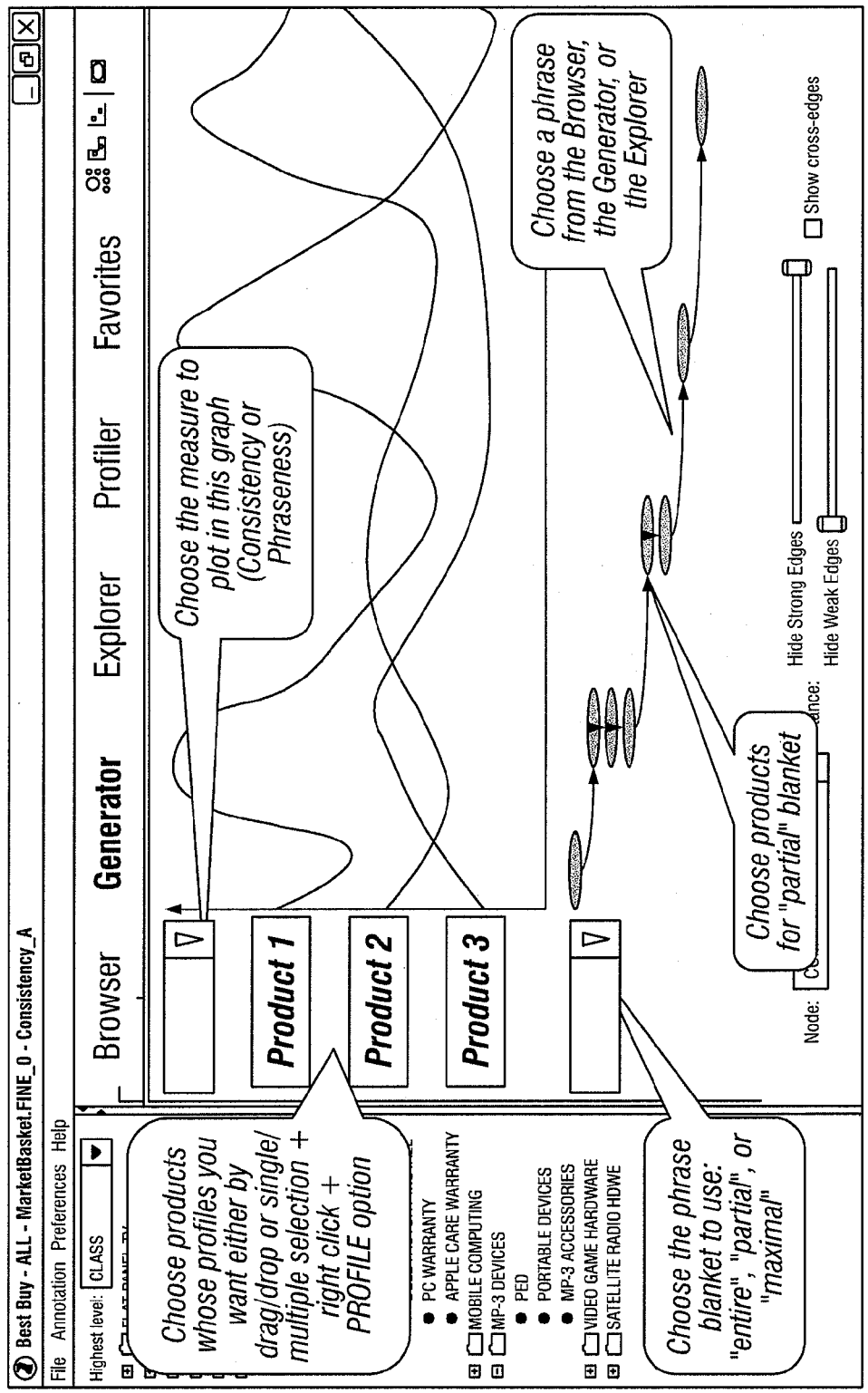
FIG. 17 is a screen shot showing a profiler panel according to the invention.

FIG. 17 is a screen shot showing a profiler panel according to the invention. In FIG. 17, the user can choose products they want by either dragging and dropping, by single or multiple selection, or by selecting a right click action plus the PROFILE option from the menu bar. The user may choose the measure to plot in the graph to show consistency of phraseness. The user may also choose the phrase blanket to use, e.g. entire, partial, or maximal. The user may choose product for a partial blanket, as well as a phrase from the browser, the generator, or the explorer.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for browsing a purchase sequence, the method being implemented by one or more data processors and comprising the steps of:
   generating, by at least one data processor, a purchase sequence analysis of a retailer's transaction data relating to purchases by a plurality of consumers;
   providing, by at least one data processor, a graphical user interface that uses said purchase sequence analysis to facilitate insight discovery and exploration of product affinities across time;
   providing a purchase sequence browser, said purchase sequence browser, in conjunction with said graphical user interface, further performing at least one any of the steps of:
   allowing a user to browse most significant product phrases discovered by an exhaustive search of product affinities across time;
   exploring a retail grammar to create both forward and backward phrase trees or alternate purchase paths starting from, or ending in, a product;
   generating consistent purchase sequences given constraints on products and their order; and
   profiling a value of a product across time with regard to other products fixed in time.

2. The method as in claim 1, wherein the graphical user interface renders
   a tree diagram showing an active product at all but a terminal time stamp;
   wherein, by default, top products are active in first and second columns;
   wherein, when a user selects any of the displayed products to be active, a list of products is populated in a next column based on all active products in the past; and
   wherein default active products are kept as a first product in a new list.

3. The method as in claim 1, wherein the graphical user interface enables backward exploration of an active product.

4. The method as in claim 1, wherein the graphical user interface enables keeping of a time lag or not for an active product;
   wherein, by default, a time-lag is one time-unit; and
   wherein said user can ignore a particular time-slot.

5. The method as in claim 1, further comprising:
   using consistencies to grow forward using a forward aggregate scoring function.

6. The method as in claim 1, further comprising:
   using consistencies to grow backward using a backward aggregate scoring function according to the invention.

7. The method of claim 1, wherein the providing comprises:
   providing one or more panels, the panels comprising at least one of:
   a product panel;
   a sequence panel; and
   a property panel.

8. The method of claim 1 further comprising:
   providing a browser panel for allowing a user to browse pre-created high consistency product phrases;
   providing an explorer panel for allowing a user to grow/shrink purchase sequences manually;
   providing a generator panel for automatically generating phrases from a product set;
   providing a profiler panel for showing time profiles of products for a given sequence; and
   providing a favorites panel for collecting sequences that a user adds to favorites.

9. The method as in claim 8, wherein the browser panel comprises:
   a drop down list from which a user selects a product;
   wherein all pre-created phrases that contain the selected product are listed in a table.

10. The method as in claim 9, wherein the table comprises the following properties:
    Phrase ID=row number in the PHRASE file;
    Trigger Product (first product) name;
    Length of the phrase; Duration of the phrase;
    Phraseness measure (min/max); and
    Ability to add other product properties as in bundles/bridges.

11. The method as in claim 8, wherein the explorer panel comprises:
    a drop-down menu that provides options to:
    Display Phrase tree;
    Explore Phrase FORWARD; and
    Explore Phrase BACKWARD.

12. The method as in claim 11, wherein a product is placed either in a top LEFT or top RIGHT corner of said explorer panel, depending on whether the user selected (FORWARD) or (BACKWARD) respectively.

13. The method as in claim 8, wherein the The purchase sequence explorer panel comprises:

a forward phase tree and a backward phase tree, each said phase tree further comprising the following parameters:
Time Scale;
Maximum Length; and
Maximum Branch.

14. The method as in claim 8, wherein the generator panel comprises at least one any of:
- a product constraint, wherein a user may select two or more products either from the product panel or from the property panel, or from a sub-graph, neighbor, bundle, or bridge structure, wherein said generator generates product phrases using only these products; and
- a set of order constraints, wherein a user specifies an order of certain products, wherein each product is anchored or non-anchored in a particular position, wherein an anchored product cannot change its position and all products above/below it must remain there in their ordering;
- wherein a sorted list of product phrases that satisfy either or both constraints is generated.

15. The method as in claim 8, wherein the profiler panel enables:
profiling any of consistency and phraseness of one or more products, wherein said profile is generated against at least one any of:
- a given phrase with an entire phrase blanket, wherein all products in a phrase affect the profile;
- a given phrase with a subset phrase blanket, wherein a chosen few products in a phrase affect the profile; and
- a given phrase with a maximal phrase blanket, wherein each profile value is maximized across available phrase blankets.

16. The method as in claim 8, wherein the profiler panel enables:
choosing measure to plot in a graph to show consistency of phraseness.

17. The method as in claim 16, wherein the profiler panel enables: choosing a phrase blanket to use.

18. A method for browsing a purchase sequence, the method being implemented by one or more data processors and comprising:
- generating, by at least one data processor, a purchase sequence analysis of a retailer's transaction data relating to purchases by a plurality of consumers;
- providing, by at least one data processor, a graphical user interface that uses the purchase sequence analysis to facilitate insight discovery and exploration of product affinities across time;
- wherein the graphical user interface enables:
  - allowing a user to browse most significant product phrases discovered by an search of product affinities across time;
  - exploring a retail grammar to create both forward and backward phrase trees or alternate purchase paths starting from, or ending in, a product;
  - generating consistent purchase sequences given constraints on products and their order; and
  - profiling a value of a product across time with regard to other products fixed in time.

* * * * *